United States Patent [19]

Ashihara et al.

[11] Patent Number: 5,143,976

[45] Date of Patent: Sep. 1, 1992

[54] POLYOLEFIN RESIN COMPOSITES

[75] Inventors: Teruaki Ashihara; Shingo Tone, both of Takasago; Ryozo Orita, Himeji, all of Japan

[73] Assignee: Toyo Kasei Kogyo Company Ltd., Osaka, Japan

[21] Appl. No.: 640,733

[22] Filed: Jan. 16, 1991

[30] Foreign Application Priority Data

Jan. 26, 1990 [JP] Japan ................................. 2-16664

[51] Int. Cl.$^5$ ...................... C08L 23/28; C08L 51/06
[52] U.S. Cl. .................................. 525/227; 525/112; 525/126; 525/193; 525/192; 525/108; 525/125; 525/179; 525/183; 525/285; 525/286; 525/293; 525/301; 525/303; 525/309
[58] Field of Search ............... 525/193, 227, 126, 285, 525/301, 303, 309

[56] References Cited

U.S. PATENT DOCUMENTS 4,112,013  9/1978  Briggs et al. .................... 525/301
4,273,894  6/1981  Mücke ............................ 525/192

OTHER PUBLICATIONS

Abstract (ACS) of published JP patent No. 18434 (1987).
Abstract (ACS) of published JP patent No. 95369 (1987).
Abstract (ACS) of published JP patent No. 95372 (1987).

Primary Examiner—Carman J. Seccuro
Attorney, Agent, or Firm—Wenderoth, Lind & Ponack

[57] ABSTRACT

The present invention concerns the polyolefin resin compositions wherein acrylic oligomers, polydiene and chlorinated polyolefins which contain 10–60 weight % chlorine are graft copolymerized. Films of the polyolefin resin compositions have good adhesive properties, moisture-resistant properties and appearance.

6 Claims, No Drawings

POLYOLEFIN RESIN COMPOSITES

BACKGROUND OF THE INVENTION

1. Field of the Invention

The present invention relates to the polypropylene-homopolymers, ethylene-propylene-copolymers and the ethylene-propylene-diene-copolymers. The molded compounds or the films of these polyolefin based resins have good adhesive properties, solvent resistant properties, moisture resistant properties and excellent appearance. The polyolefin based resins may be used as a primer or a 1-coat finishing for paints, inks or other various adhesives etc.

2. Description of the Prior Art

Formerly, the polyolefin based resins have been used in a wide variety of fields, e.g. for cars and electric appliances, etc. This is due to the superior physical properties that the said polyolefin based resins exhibit, and more prominently, the waterproof, heat resistant, reagent resistant and electric insulating properties of these resins. Moreover, these resins are not so costly and, therefore, are in great demand. It is a serious obstacle that said polyolefin based resins are crystalline and thus the adhesive properties and coating properties are inferior; therefore, in order to increase the adhesive and coating properties, it has been suggested to modify the surface of the said resins by an acid treatment or by a physical method such as a corona discharge method. But in these cases, the procedures are troublesome and very costly and to avoid such processes as described above, there are many inventions concerning primer compositions, such as used for the bumpers of cars. (See published JP unexamined patent application No. 95372 (1987) and published JP unexamined patent application No. 95369 (1987). In these inventions described above, the physical properties such as the adhesive strength and solvent resistance of the polyolefin resins are somewhat improved, but there is a problem that the manufacturing procedures become complicated because the overcoating is performed after coating the primer onto the substrate. Therefore, the chlorinated polyolefin compositions or copolymers are suggested to be used as 1-coat coating compositions. (See published JP unexamined patent application No. 18434)).

Formerly, polyolefin resin compositions used for coatings had various problems as described above and, in order to increase the coating properties, the polyolefin resins (e.g. chlorinated polyolefins) which are blended with various polymers, e.g. acrylic or polyurethane, are such that these polymers are fundamentally insoluble in the chlorinated polyolefin resins and have the problem of lower gloss and inferior dispersion of the pigments. For instance, in the case of the chlorinated polyolefins modified with those acrylic monomers described in the above-mentioned published JP unexamined patent application No. 18434 (1987), the weather resistant, moisture resistant and solvent resistant properties and the hardness of the coated films are inferior and cannot be cured of the bad influence caused by the remaining monomers.

SUMMARY OF THE INVENTION

The present invention aims to attain the following objectives (a)–(d) in order to achieve better properties than the properties of the coatings heretofore in use such as in conventional 1-coat polyolefin compositions or as primers for paintings, etc.

(a) The adhesive properties and the adhesive strengths of the coatings for the polyolefins are increased by modifying the chlorinated polyolefin compositions.

(b) The hardening reaction of the chlorinated polyolefins are achieved by introducing functional radicals into the molecule of the chlorinated polyolefins.

(c) The mutual solubility of the chlorinated polyolefins of the present invention is improved and the mutual solubilities with other polymers, e.g. acrylic polymers or urethane polymers, etc., are increased.

(d) Moreover, the dispersibility of the pigments which exist in the coating solution is increased.

DETAILED DESCRIPTION OF THE INVENTION

To attain the above objects, the present invention is composed of firstly, as main ingredients, graft copolymers of acrylic oligomers (A) and polydiene (B) grafted onto chlorinated polyolefins (C) containing 10–60 weight % chlorine. Secondly, the polyolefin resin compositions composed of the acrylic oligomers, as described above, contain hydroxyl or carboxyl or carboxyl anhydride groups and/or one acrylic oligomers or mixtures of not less than 2 acrylic oligomers selected from acrylic oligomers which contain no functional groups and those that do. Thirdly, the polyolefin resin compositions described above may contain a hardener which reacts with the functional groups in (A) or (B). The main ingredients (A), (B) or (C) of the present invention are used alone or together with a hardener, for example polyisocyanates, polyamines, acid anhydrides or polyamides.

As the range of the uses of the present invention increases when said acrylic polymers react with the hardener, it is desirable to use acrylic oligomers having functional radicals, e.g. hydroxyl radicals or carboxyl radicals or mixtures of said acrylic oligomers and acrylic oligomers having no functional radicals. Further, it is preferable that the hydroxyl value of the resins obtained by the graft copolymerization of (A), (B) and (B) be over 2 as to solid matter—and preferably 10–200 in order to exhibit their functions. In the case wherein the hydroxyl value is under 5, the bridging density with the polyisocyanate is lowered and the solvent resistant and the moisture resistant properties of the coated films are also lowered, and in the case wherein the hydroxyl value is over 200, the appearance of the liquid deteriorates. In the case when the polyolefin resins obtained by the graft copolymerization of (A), (B) and (C) have carboxyl radicals and/or acid anhydride radicals, the acid value should be over 2 and preferably 10–200 in order to exhibit their functions for the same reasons described in respect to the hydroxyl values. Moreover, in the case of polyolefin copolymerization resins, including those having amino radicals and/or amide radicals, the hydroxyl values or the acid values have an optimum range, respectively, as described above. It is fundamentally preferable that the values of the hydroxyl radicals or carboxyl radicals and acid anhydride radicals have similar values for the reasons described above.

The typical compounds of the acrylic oligomers (A) used in the present invention are characterized as having definite repeating units in the molecule and at least one or preferably not less than two double bonds in the molecule. These compounds necessarily contain so called macromonomers or macromers. The range of the molecular weight of these macromonomers are from several hundred to tens of thousands. The copolymers obtained from the use of such components have certain properties, which are different in kind and molecular weight from the macromonomers contained therein. As the acrylics oligomer (A) used in the present invention, there may be used, e.g. caprolactone modified acrylic acid ester oligomers and methacrylic acid ester oligomers (which include the primary hydroxyl radical), acrylic ester oligomers and methacrylic ester oligomers having hydroxyl radicals at the terminal, oligoester acrylates and methacrylates, polyesteracrylates and methacrylates, urethane acrylates and methacrylates and epoxy acrylates and methacrylates, etc. These compounds include hydroxyl groups, carboxyl groups, acid anhydride groups, amino groups or compounds which include functional groups in the molecule simultaneously or include mixtures of compounds. Moreover, there are included compounds having polymerizable functional end groups, e.g. styrene macromonomers having methacryl groups as the end groups, butylacrylate macromonomers, styrene macromonomers having hydroxyl groups at the terminal, styrene-acrylonitrile macromonomers, styrene macromonomers having carboxyl groups at the terminal and isobutylmethacrylate macromonomers having methacryloyl groups at the terminal, etc. The polydiene compounds (B) used in the present invention aims at imparting elastic properties to the coated film and at increasing the mutual solubility with acrylic oligomers (A) or their copolymers and the chlorinated polyolefin compounds (C). The polydiene compounds (A) include polybutadiene, polypentadiene, polyisoprene and polychloroprene. The above described polybutadiene is a liquid type polybutadiene, which is obtained by polymerizing a butadiene monomer using a catalyst by a special polymerization method and has a hydroxyl radical, a carboxyl group or an acid anhydride group at the terminal or within the molecule. Other polydienes containing liquid type gums, e.g. liquid chloroprene, liquid isoprene or liquid polypentadiene, can be used. Especially, among the above described polydienes, an optimum type of polydiene used in the present invention is both mutual soluble with the chlorinated polyolefin and the acrylic oligomers (A) or their copolymers, and moreover, if functional radicals at the terminal or within the molecule of the liquid gums are effectively used, it is possible to attain better coating properties. The chlorinated polyolefins (C) used in the present invention are ingredients which give adhesive properties to the coated film, and the content of the chlorine in said chlorinated polyolefins (C) is in the range of between 10-60 weight preferably 20-50 weight %.

If the chlorine content is less than 10 weight %, the stability of the solvent is inferior at lower temperatures and the appearance of the coated film is inferior, whereas in the case where the chlorine content is not less than 60 weight %, the adhesive properties for the polyolefin resins are lowered. The raw materials of the chlorinated polyolefins (C) are crystalline polypropylenes, amorphous polypropylenes, polybutenes, low density polyethylenes, high density polybutenes, low density polyethylenes, high density polyethylenes ethylene-propylene copolymers, ethylene-propylene-diene copolymers or ethylene-vinylacetate copolymers, etc., and moreover the modified polyolefin resins, which have carboxyl, hydroxyl and acid anhydride radicals introduced are used in the present invention.

The chlorination of the polyolefins are carried out easily by using ordinary reaction methods, for instance, a chlorinated gas is introduced into polypropylene dissolved in a chlorohydrocarbon, such as tetrachlorhydrocarbon, a catalyst is optionally added and radiation may be carried out with ultra-violet light. The reaction proceeds under pressure or at atmosphere pressure. The reaction may be carried out at a temperature range from room temperature to 130° C. and the chlorinated polyolefins (C) in the present invention contain improved polyolefins modified with the maleic acid anhydride. In this case, the modification is performed by ordinary known methods, e.g. the polyolefin is dissolved in aromatic hydrocarbons, especially toluene, maleic acid anhydride is introduced at a temperature of 70° C. -120° C. and a catalyst is optionally added. The reaction may be carried out in coexistence with the 3rd elements.

By using the maleic anhydride modified chlorinated polyolefins, the adhesive properties and the mutual solubility properties with respect to other resins, especially acrylic or urethane resins, are much improved.

Graft copolymerization of the acrylic oligomers (A) and the polydiene (B) onto the chlorinated polyolefins (C) is carried out by solution polymerization. The solvents preferably used in the present invention are aromatic hydrocarbons, such as toluene or xylene, and also esters, ketones, chlorinated hydrocarbons, aliphatic and aromatic alcohols and mixtures of these materials may be used.

As the polymerization initiator, there may be used peroxide compounds, such as azobisisobutyronitrile. The fundamental method of polymerization is such that the polydiene (B) and the chlorinated polyolefins (C) are suitably diluted with a solvent and mixed and, after adding the polymerization initiator, the mixture is heated and the acrylic oligomer (A) is added slowly and reacted. (A), (B) and (C) may also be blended previously and after adding the polymerization initiator, hardners such as polyisocyanates, epoxy resins, polyamines, polyamides, polythiols, etc., may be used, and those hardeners which can react with the functional groups of the main ingredient of the copolymers. For example, as the hardener, the following may be employed. In the case when a hydroxyl radical exists in the copolymer, polyisocyanates are used; for the acid anhydride groups, epoxy resins are used; and for epoxy radicals, polyisocyanates, polyamines or polythiols are used.

The reaction products ratio of the acrylic oligomers (A), the polydiene (B) and the chlorinated polyolefin (C) is decided carefully after a thorough study of the surface hardness, light resistance, organic solvent resistance, etc., of the coated substance. In the case when the said reaction products ratio is too large or too small, the obtained coated film is not good. For example, it is preferable to graft copolymerize them using acrylic oligomers (A) in amounts of 5-100 of weight %, polydiene (B) in amounts of 1-300 weight % grafted onto the chlorinated polyolefin (C) used in an amount of 100 weight %.

When adding a hardener to the reaction product, it is preferable to use 0.01-10 mols of the functional groups of the hardeners per functional group of the solid resins, obtained by the copolymerization of (A), (B) and (C).

In the case wherein the functional radicals of the solid main ingredients of the copolymer are comparatively few, there are many cases, however, in which the objective properties are satisfied. In such cases, the hardeners are not necessarily needed in order to conserve on the industrial mixing equipment needed to save time. The present invention, therefore, includes polyolefin resin compositions manufactured by not using hardeners.

EXAMPLES

The following examples will better enable one to understand the present invention:

EXAMPLE 1

In a flask fitted with an agitator and thermometer, are introduced the following materials:

1. 100 parts of HARDLEN 14-LLB (chlorinated polyolefin), (manufactured by TOYO KASEI KOGYO LTD.) which are characterized as follows:

| | |
|---|---|
| Chlorine Content | 27% |
| Non Volatile Matter: | 30% |
| Weight Mean Molecular Weight: | 30,000 |

2. 15 parts of polybutadiene G-1000 (Manufactured by NIHON SODA CO., LTD.) having the following characteristics:

| | |
|---|---|
| Numerical Mean Molecular Weight: | 1,000 |
| Hydroxyl Radicals: | 15 parts, at both terminals |
| Toluene: | 35 parts |
| 3. Benzoylperoxide: | 0.3 part |

Air is replaced completely with Nitrogen gas in the reaction vessel, and the reactions proceed in an $N_2$ atmosphere to the end of the reaction and, subsequently, the temperature of this system is raised to 85° C. and is agitated for 2 hours at 85° C.

4. An acrylic oligomer, Placcel FA 4, 6.0 gr (manufactured by DAICEL CHEMICAL CO. LTD.)

| | |
|---|---|
| Hydroxyl value: | 98 |
| Molecular weight: | 570 |

5. Styrene acrylonitrile macromonomer AN-6, 2.0 g (manufactured by TOA GOSEI KAGAKU KOGYO COMPANY LTD.) which is characterized as:

| | |
|---|---|
| having methacryloyl groups at one terminal | |
| Molecular weight: | 6000 |

6. Isobutyl methacrylate macromonomer AW-6S, 1.0 g (manufactured by TOA GOSEI KAGAKU KOGYO CO. LTD.) which is characterized as:

| | |
|---|---|
| having methacryloyl radicals at the terminals | |
| Molecular weight: | 6000 |
| 50% weight % toluene solution | | and the mixtures of 4-6 (toluene solution, solid matter 36%) are poured into the flask for over 1 hour and the copolymerization is completed. After pouring the reagent, cooling, filtering and adding 0.1 g Benzoylperoxide and agitating for 3 hours at 85° C., the copolymerization reaction is completed in a total of 6 hours. After the copolymerization is completed, the polymer solution is cooled to 50° C., and filtered. The compositions thus-obtained are uniform and have good appearances.

There is a 33.3 weight % non-volatile matter thus-obtained in this Example 1. Then, after this mixture in an amount of 100 g and toluene in amounts of 28 g are mixed, agitated and dispersed for 3 hours, using a ball mill and added polyisocyanate, COLONATE HL (hardener) (manufacture by NIHON POLYURETHANE KOGYO CO., LTD.) 9.5 g is added with dibutyltindilaurate 1.0 g as an accelerator. The viscosity is regulated at 12-13 seconds, measured by a No. 4 FORD CUP, using toluene as a solvent and a polypropylene board J-4H (manufactured by MITSUI PETROLEUM CHEMICAL CO., LTD.) is dipped into the manufactured solution—and the polypropylene board is press-casted at 200° C. for 10 minutes and coated, and thereafter dried at room temperature for 1 hour. The coated film is tested and the test results are shown in Table 1.

EXAMPLE 2

Example 1 is repeated except polybutadiene G-1000 is substituted by polybutadiene TEA 1-3000 (manufactured by NIHON SODA CO. LTD.) and its numerical mean molecular weight is 3000 and has methacryloyl groups at both terminals. Further, the AN6 of Example 1 is changed to macromonomer AA-5 (manufactured by TOA GOSEI CO. LTD.) with a molecular weight of 6000 and the COLONATE HL of Example 1 is changed to isocyanate COLONATE L (hardener) (manufactured by NIHON POLYURETHANE KOGYO CO. LTD.). The other components of Example 1 are unchanged. The materials are copolymerized and coating films are prepared under quite similar testing methods as in Example 1. The test results are shown in the Table 1.

EXAMPLE 3

Example 1 is repeated except HARDLEN 14-LLB is substituted by chlorinated polypropyrene, i.e. HARDLEN 13-LB (manufactured by TOYO KASEI KOGYO CO. LTD.) with a chlorine content of 25%, non-volatile matter 30 weight %, and with a weight mean molecular weight 110,000. The PLACCEL FA 4 of Example 1 is substituted with acrylic acid-2-hydroxyl ethyl oligomer (manufactured by NIHON SHOKUBAI KAGAKU CO. LTD.) having a mean molecular weight of 230, and the other components are unchanged. The materials are copolymerized and are prepared for a paint and the coated films tested as in Example 1. The results are shown in Table 1.

EXAMPLE 4

Example 1 is repeated, except HARDLEN 14-LLB is substituted by chlorinated polypropylene modified by the maleic acid anhydride, i.e. HARDLEN 14-ML (manufactured by TOYO KASEI KOGYO CO. LTD.) with a chlorine content of 26%, a weight molecular weight of 40,000, a non-volatile matter of 30 weight % in a toluene solution. PLACCEL FA4 is substituted by acrylic oligomers ALOMIX M-5400 (manufactured by TOA GOSEI KAGAKU KOGYO CO. LTD.) containing carboxyl radicals and an acid value 200 (KOH mg/g). Similarly, AN-6 is substituted by macromonomer AB-6 (manufactured by TOA GOSEI KAGAKU KOGYO CO. LTD.) with a molecular weight 6000 and the other materials of Example 1 are unchanged. The materials are copolymerized and prepared for a paint. Coating films are produced and the test results are shown in the Table 1.

EXAMPLE 5

Example 1 is repeated, except HARDLEN 14-LLB is substituted by a chlorinated polypropylene HARDLEN 12-LLB (manufactured by TOYO KASEI KOGYO CO., LTD.) chlorine content 24%, weight mean molecular weight 50,000, non-volatile matter 30% (in a toluene solution). Further, the G-1000 of Example 1 is substituted by polybutadiene EP-1054 (manufactured by NIHON SODA CO. LTD.) characterized as having a numerical mean molecular weight of 1000 containing epoxy radicals in the molecule. Then, "15 parts of G-1000" is substituted by "30 parts of G-1000". The other materials of Example 1 are unchanged. The materials are copolymerized and coated films prepared. The copolymerization reaction liquid is uniform and has good appearance. The testing results are shown in the Table 1.

COMPARATIVE EXAMPLE 1

In the above Example 3, HE 10 is substituted by 2-hydroxyl-ethyl-acrylic acid and AN-6, 2.0 g, is substituted with a mixture of a styrol monomer and acrylonitrile 2.0 g (weight ratio 1 to 1) and AW-6S is substituted in Example 3 by isobutyl methacrylate monomer. The other materials are the same as Example 3. Copolymerization and the preparation of paints and the testing of the coated films are carried out. The results are shown in Table 1.

EXAMPLE 6

In Examples 1 to 5 and the above Comparative Example 1, the copolymerized products are coated independently onto a polypropylene board, and on the other hand, in the compositions as shown in each of the examples, the solution with the added polyisocyanate is regulated in viscosity so that the coated film is 2-5 microns in a dry state. The coated plates are dried and set similarly as in Example 1 and these coated plates are tested as primer coated plates. The results are summarized in Table 1.

TEST METHOD (a) Adhesive properties

A grid test is made in accordance with the method of JIS K5400 (1990) (Cross-Cut Scotch Tape Test) using 100 grids of a coated film with space intervals of 1 mm and using an adhesive cellophane tape manufactured by NICHIBAN CO. LTD. The adhesive properties are decided by the remaining grids on the coated film.

(b) Weathering test

Test solutions are coated in a thickness of about 100 microns (resin base) on acrylic resin plates which have an inclined angle of 45 degree and dried and the said coated acrylic resin plates are fixed on a glass plate with a southern exposure for about 100 days, and the coated film examined by its grade of coloring on the surface.

(c) Hot water test

Polypropylene plates coated with the solution of the present invention are dipped in 40 degree hot water for about 300 hours, and the damages in the appearance of the surfaces of the coated films are examined.

(d) Gasoline test

The surface of the coated film is rubbed 50 times with a gasoline soaked absorbent cotton and the damage to the surface of the coated film is examined.

(e) Degree of dispersion of the pigments

Toluene solutions of the main components with a hardener and promoting agent added, with a viscosity of 13-15 seconds as measured by the No. 4 FORD CUP are prepared, and the precipitation of the pigments and time of separation of the pigment layers from the said toluene solutions are examined.

(f) Compatibility for the acrylic copolymer

A 10% toluene solution of the copolymerization reaction product of the present invention is mixed with an acrylic copolymer DIANAR BR-115 manufactured by MITSUBISHI RAYON CO. LTD. so that the weight ratio of this toluene solution to the acrylic copolymer is 1:1 and coated onto the surface of glass and the compatibility of the solution is examined based on the transparency of the dried coated film.

TABLE 1

| Experiment No. | | Use | Hardner | Adhesive propety (Cross cut scotch test) | Outdoor Weathering test | Warm water resistant test (40° C., 30 hr) | Gasoline resistant test (lapping test) | Paint disperse Property | Mutual solubility of Acrylic monomer |
|---|---|---|---|---|---|---|---|---|---|
| Exp No. | 1 | One coat | Colonete HL | o | o | o | o | o | o |
| | 6 | Primer | none | o | o | o | o | — | o |
| | | | Colonate HL | o | o | o | o | — | o |
| Exp No. | 2 | One coat | Colonate HL | o | o | o | o | o | o |
| | 6 | Primer | none | o | o | o | o | — | o |
| | | | Colonate HL | o | o | o | o | — | o |
| Exp No. | 3 | One coat | Colonate HL | o | o | o | o | o | o |
| | 6 | Primer | none | o | o | o | o | — | o |
| | | | Colonate HL | o | o | o | o | — | o |
| Exp No. | 4 | One coat | Colonate HL | o | o | o | o | o | o |
| | 6 | Primer | none | o | o | o | o | — | o |
| | | | Colonate HL | o | o | o | o | — | o |
| Exp No. | 5 | One coat | Colonate HL | o | o | o | o | o | o |
| | 6 | Primer | none | o | o | o | o | — | o |
| | | | Colonate HL | o | o | o | o | — | o |
| Comparative Exp No. | 1 | One coat | Colonate HL | Δ | o | o | Δ | o | o |
| | | Primer | none | o | x | x | Δ | — | o |
| | | | Colonate HL | Δ | o | Δ | Δ | — | o |

Remarks:
o good
Δ slightly bad
x bad

EFFECT OF THE INVENTION

The effects of the present invention are summarized as follows:

Polyolefin resin films are prepared from the composition of the present invention and dried from room temperature to 160° C. A one coat hardening film or a primer hardening film is obtained, and the thus-obtained coated films show far better adhesive properties than other coated films of one coat finishings.

Further, the films of the present invention have excellent weather resistant, humidity resistant, water resistant and gasoline resistant properties than conventional films. Also, the dispersibility of the pigments in solution are improved over the invention of published JP unexamined patent application No. 95372 (1988) and No. 95369 (1988). Moreover, it becomes clear that the polyolefin resin compositions of the present invention show superior adhesive properties for polyolefin resins and at the same time, the compatibility with other polymers is increased. These properties make it possible to use such coatings as paints, inks, adhesives and the like.

What we claim is:

1. A polyolefin resin composition comprising as main ingredients, a graft polymer obtained by the graft polymerization of acrylic oligomers (A) and polydiene (B) onto a chlorinated polyolefin (C) containing 10-60 weight percent of chlorine.

2. A polyolefin resin composition according to claim 1, in which the oligomers (A) contain one or two groups selected from the group consisting of hydroxyl radicals, carboxyl radicals, anhydride carboxyl radicals or amine radicals or are mixtures of acrylic oligomers selected from the acrylic oligomers which contain functional radicals and acrylic oligomers which do not contain functional groups.

3. A polyolefin resin composition according to claim 1, which contains a hardener which reacts with the functional radicals of the acrylic oligomers (A) and/or the polydiene (B).

4. A polyolefin resin composition according to claim 1, wherein the acrylic oligomers (A) and polydiene (B) are graft polymerized onto said chlorinated polyolefin (C) and wherein the thus-produced resin composition contains a hydroxyl value 10-200 based on the solid matter of said polyolefin resin composition or the produced polyolefin resin composition contains carboxyl radials and/or acid anhydride radicals and, in the latter case, the said polyolefin resins composition ha an acid value of 2-200, based on the solid matter of the said polyolefin resin composition.

5. A polyolefin resin composition according to claim 1, wherein acrylic oligomers (A) are present in amounts of 2-200 weight parts and polydiene (B) is present in amounts of 1-300 weight parts, are graft polymerized onto 100 weight parts of a chlorinated polyolefin containing 10-60 weight % Cl.

6. A polyolefin resin composition according to claim 1, wherein a hardener is employed consisting of a member selected from the group consisting of polyisocyanates, epoxy amines, polyamides and polythiols.

* * * * *